United States Patent [19]
Turgut

[11] Patent Number: 5,815,465
[45] Date of Patent: Sep. 29, 1998

[54] METHOD AND APPARATUS OF CLASSIFYING MARINE SEDIMENT

[76] Inventor: Altan Turgut, 3108 White Daisy Pl., Fairfax, Va. 22031

[21] Appl. No.: 835,970

[22] Filed: Apr. 11, 1997

[51] Int. Cl.$^6$ ..................................................... G01V 1/38
[52] U.S. Cl. ............................... 367/87; 367/15; 367/21; 73/170.32
[58] Field of Search ................................ 367/87, 131, 99, 367/15, 21; 73/170.32

[56] References Cited

U.S. PATENT DOCUMENTS

| | | | |
|---|---|---|---|
| 5,559,754 | 9/1996 | Carnaggio et al. | 367/15 |
| 5,606,533 | 2/1997 | Cranford et al. | 367/88 |

OTHER PUBLICATIONS

A. Turgut et al., *Synthetic Seismograms for Marine Sediments and Determination of Porosity and Permeability*, Geophysics, vol. 53, pp. 1056–1067 (No. 8, Aug. 1988).

Journal of the Acoustical Society of America, vol. 99, No. 4, Pt. 2, p. 2451.

Letter from Brian Schmitt to Ed Miles dated Apr. 2, 1997, Concerning AB, above.

Stern et al., "Wave reflection from a sediment layer with depth dependent properties", Journal of the Acoustical Society of America, vol. 77, No. 5, pp. 1781–1788, May 1985.

*Primary Examiner*—Ian J. Lobo
*Attorney, Agent, or Firm*—Thomas E. McDonnell; Edward Miles

[57] ABSTRACT

An acoustic classification system in which echoes from sediment-sediment or water-sediment interfaces are compared to model waveforms predicted by Biot's equations for a given set of acoustic material parameters. The selection of parameters are varied until a match occurs, indicating the correct parameters of the reflecting sediments. Preferably, the variation of selected test parameters is conducted by formal search algorithms, such as simulated annealing or genetic algorithms, to increase computational efficiency.

5 Claims, 3 Drawing Sheets

METHOD AND APPARATUS OF CLASSIFYING MARINE SEDIMENT

BACKGROUND OF THE INVENTION

Various schemes are known to classify marine sediments. Common to all is the launching of an acoustic pulse into the water column above the sediments, detecting echoes of the pulse reflected from various sediment layers, and processing the pulses in accordance with some model to infer the acoustic parameters of the various layers, which, if done accurately, effectively identifies the constituents of the sediments, e.g. sand, clay, gravel, etc.

One scheme is to use the first received echo to estimate the reflection coefficient of the bottom layer at the water-bottom interface, and then using that result and known acoustic scattering models to calculate other acoustic parameters for the layer. Using this result as a starting point, one then sequentially calculates reflection and transmission coefficients of layers progressively deep into the sediment and in like manner infers other acoustic parameters of the respective layers. This has two drawbacks: because one calculates each acoustic parameter separately, and each calculation depends on the preceding ones, errors can accumulate rapidly; these sorts of calculations are based on models which treat the sediments as fluid so that they scatter only into fast compressional waves. In fact, scattering at interfaces also occurs into slow compressional waves, which, because they are attenuated in very short distances, are not detected. Nonetheless, by ignoring this energy loss, the models on which the calculations are based are inherently inaccurate.

Another scheme is to take the original acoustic pulse and an echo, and using these calculate a transfer function for the reflecting interface. This requires inversion of matrices, which is frequently not possible.

SUMMARY OF THE INVENTION

Accordingly, an object of the invention is to increase the accuracy of sediment classification by using an acoustic scattering model which can calculate many acoustic parameters related to an acoustic interface globally, i.e. simultaneously, rather than deriving from on parameter (acoustic impedance) and then using relations to estimate the other parameters.

Another object is to increase the accuracy of sediment classification by using an acoustic scattering model which accounts for energy loss due to slow compressional waves induced at acoustic boundaries.

Another object is to increase reliability of sediment classification by making it unnecessary to invert matrices in order to identify sediment constituents.

Another object is to increase the accuracy of sediment classification by using a highly respected acoustic scattering model known for its accuracy.

In accordance with these and other objects made apparent hereinafter, the invention concerns a method and apparatus for characterizing marine sediments by launching an acoustic pulse, into the sediments and detecting echoes from the sediments. For each echo, and using Biot's equations, values of acoustic parameters are selected, the waveform of the echo which these parameters would produce is calculated (called a model waveform) and compared to the actual echo. New parameters are iteratively selected, and this is repeated until a sufficiently close match is achieved, thus identifying the acoustic parameters of the interface between sediment layers which produced the echo, hence characterizing the constituents of the layers. In this manner, the characterizing proceeds downward from the water-bottom interface, and the parameters identified for each layer used in the calculation of the next sequential layer.

Preferably, the iterative selection of acoustic parameters is performed by know searching algorithms to make the search highly efficient.

In so doing, for each layer one determines all the acoustic parameters for each layer at one time, rather than making the determination of one parameter dependent on an earlier determination of another such as attenuation, thus reducing calculational error. In solving Biot's equations in this manner, one also solves for the effects of slow compressional waves, and thus this information is not lost, but rather contributes to the accuracy of the calculation. This approach requires no matrix inversion, and thus is applicable to a wider range of applications.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
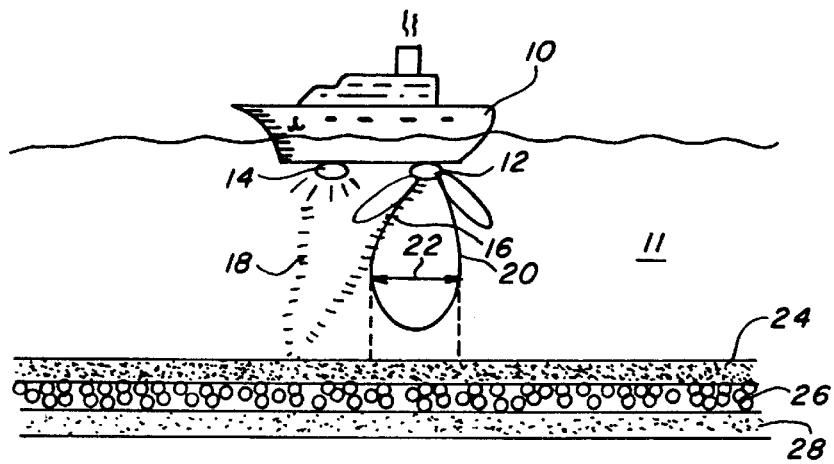
FIG. 1 is a schematic view illustrating the manner in which data is taken for the invention.

With reference to the drawing figures, wherein like numbers indicate like parts throughout the several views, FIG. 1 shows a ship 10 afloat in a body of water 11 above a bottom sediment 24, and lower sediment layers 26, 28. (For simplicity of illustration, FIG. 1 shows only three sediment layers. Naturally, any marine sediment will have more, and the invention can characterize as many sediment layers as one's acoustic detection equipment can detect echoes.) Ship 10 has an acoustic signal generator 14 which launches acoustic pulses 18 into water 11, and an acoustical transducer 12 for detecting echoes 16 of pulses 18.

Figure 2:
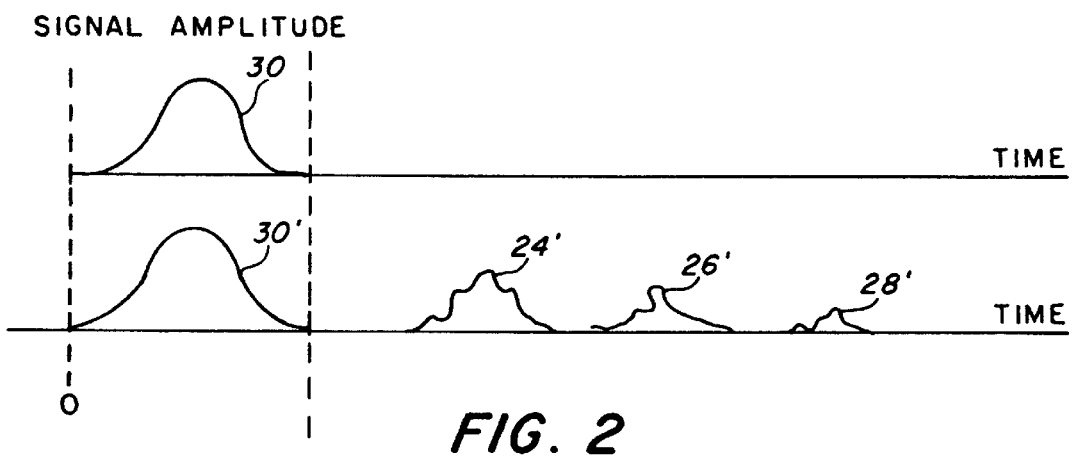
FIG. 2 is a graph, illustrating an acoustic pulse usable with the invention, and echoes of the pulse.

FIG. 2 illustrates the character of echoes 18 from bottom sediments 24, 26, 28, as received in acoustic transducer 12. Waveform 30 is the pulse envelope generated by signal generator 14, or, more precisely, the envelope of the signal generated by 14. In practice the signal from 14 will be some oscillatory signal, preferably a wideband one such as a chirp, for reasons discussed below. (For convenience, the terms pulse and pulse envelope will hereafter be used interchangeably.) The lower time axis of FIG. 2 shows signals received by detector 12 responsive to pulse 30. Pulse 30' results from direct coupling between generator 14 and transducer 12, which transducer 14 receives virtually immediately upon generation of pulse 30. Thereafter, transducer 12 receives bottom echoes 24', 26', 28' of pulse 30, which represent acoustic reflections from the interface of water 11 and bottom sediment 24, from the interface between sediment layers 24 and 26, and from the interface between sediment layers 26 and 28, respectively. As shown in FIG. 2, the shapes of the echo pulses differ from one another and from pulse 30. This is because pulse 30 is spectrally complex (i.e. not monotonal, and preferably wideband), and the acoustic reflection and transmission coefficients sediments 24, 26, 28 are frequency dependent, and hence the interaction between pulse 30 and the sediments cause different spectral components of pulse 30 are attenuated to different degrees in the different sediment layers.

Figure 3:
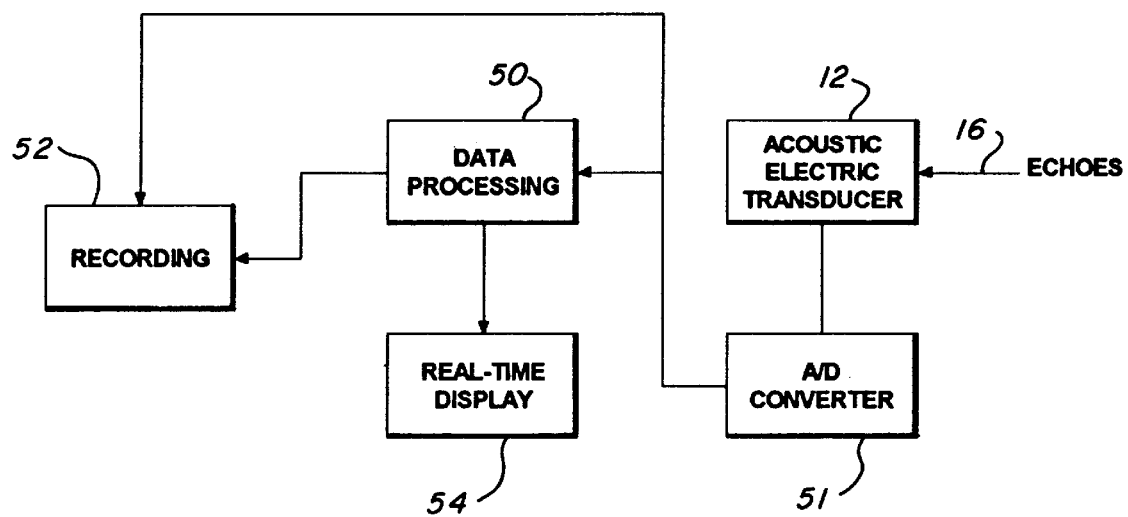
FIG. 3 is a block diagram illustrating apparatus of an embodiment of the invention.

FIG. 3 shows a general arrangement for processing echoes 24', 26', 28'. Transducer receives echoes 16, and converts them to analog electric signals, which analog to digital converter 51 sample and digitize. Data processor 50 receives the digitized echoes, as does optional recorder 52, which records raw data for archiving, or later analysis. Recorder 52 can be any conventional storage medium, e.g. computer disc, magnetic tape, etc. Processor 50, too, can be any conventional device useable for data analysis, but is preferably a dedicated process computer, PC, or work station which can easily be put on or taken off of ship 10. In detecting the echoes, it is preferred to use pulse compression techniques to improve resolution.

Figure 4:
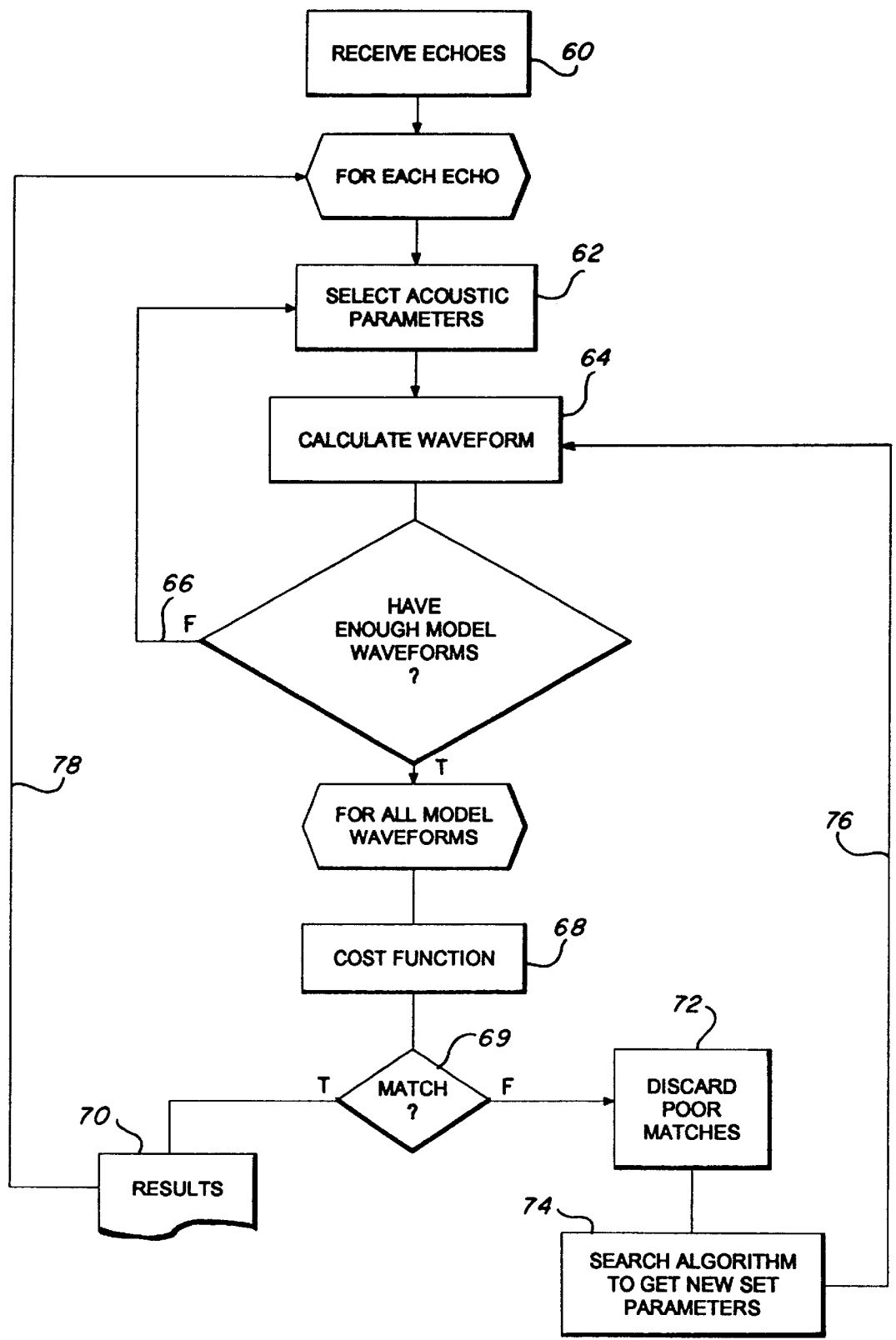
FIG. 4 is a process flow diagram, illustrating application of an embodiment of the invention.

FIG. 4 shows a preferred scheme for processing echoes 24', 26', 28'. In doing this, processor 50 employs Biot's theory, which can be summarized as follows:

(a) Fluid-sediment interface $$\begin{bmatrix} -1 & 1-m'_1 & 1-m'_2 \\ 1 & \dfrac{(C'm'_1-H')l'_1}{-H l_1} & \dfrac{(C'm'_2-H')l'_2}{-H l_1} \\ 1 & \dfrac{(M'm'_1-C')l'_1}{-H l_1} & \dfrac{(M'm'_2-C')l'_2}{-H l_1} \end{bmatrix} \begin{bmatrix} R_1(\omega) \\ T_1(\omega) \\ T_2(\omega) \end{bmatrix} = \begin{bmatrix} 1 \\ 1 \\ 1 \end{bmatrix},$$

(b) Sediment-fluid interface $$\begin{bmatrix} -1 & -\dfrac{1-m_2}{1-m_1} & \dfrac{1}{1-m_1} \\ 1 & \dfrac{(Cm_2-H)l_2}{(Cm_1-H)l_1} & \dfrac{-H'l'_1}{(Cm_1-H)l_1} \\ 1 & \dfrac{(Mm_2-C)l_2}{(Mm_1-C)l_1} & \dfrac{-H'l'_1}{(Mm_1-C)l} \end{bmatrix} \begin{bmatrix} R_1(\omega) \\ R_2(\omega) \\ T_1(\omega) \end{bmatrix} = \begin{bmatrix} 1 \\ 1 \\ 1 \end{bmatrix},$$

(c) Sediment-sediment interface $$\begin{bmatrix} -1 & -1 & 1 & 1 \\ -1 & -\dfrac{m_2}{m_1} & \dfrac{m'_1}{m_1} & \dfrac{m'_2}{m_1} \\ 1 & \dfrac{(Cm_2-H)l_2}{(Cm_1-H)l_1} & \dfrac{(C'm'_1-H')l'_1}{(Cm_1-H)l_1} & \dfrac{(C'm'_2-H')l'_2}{(Cm_1-H)l_1} \\ 1 & \dfrac{(Mm_2-C)l_2}{(Mm_1-C)l_1} & \dfrac{(M'm'_1-C')l'_1}{(Mm_1-C)l_1} & \dfrac{(M'm'_2-C')l'_2}{(Mm_1-C)l_1} \end{bmatrix} \begin{bmatrix} R_1(\omega) \\ R_2(\omega) \\ T_1(\omega) \\ T_2(\omega) \end{bmatrix} = \begin{bmatrix} 1 \\ 1 \\ 1 \\ 1 \end{bmatrix}.$$

Where H,$u$, C, and M are Biot's complex elastic moduli with the assumption of slightly imperfect elasticity, $\iota$ is complex wave number, primed quantities refer to the bottom layer of an interface, unprimed quantities refer t the top layer, and:

$$m_1 = [H(\iota_1)^2/\rho\omega^2 - 1]/[C(\iota_1)^2/\rho\omega^2 - \rho_f/\rho]$$

$$m_2 = [H(\iota_2)^2/\rho\omega^2 - 1]/[C(\iota_2)^2/\rho\omega^2 - \rho_f/\rho]$$

$$m_1' = [H'(\iota'_1)^2 \rho'\omega^2 - 1]/[C'(\iota'_1)^2/\rho'\omega^2 - \rho'_f/\rho']$$

$$m_2' = [H'(\iota'_2)^2/\rho'\omega^2 - 1]/[C'(\iota'_2)^2/\rho'\omega^2 - \rho'_f/\rho']$$

where $\rho_f$ is fluid density in the sediment, $\rho$ is sediment density, and $\omega$ is angular frequency of the acoustic signal.

These equations describe acoustic reflection and transmission at boundary interfaces, and relate acoustic parameters of the materials constituting two interfacing layers (the matrices at the left of each equation, hereafter collectively called the parameter matrices' for convenience) to the reflection and transmission coefficients of the interfacing layers (indicated by R and T, respectively) for both fast and slow compressional waves (indicated by subscripts 1 and 2, respectively) for the reflection and transmission coefficients; thus, e.g., $T_2$ indicates a transmission coefficient for a slow compressional wave). As indicated above, R and T are functions of $\omega$, i.e. are frequency dependent. As mentioned above, echoes 24', 26', 28' returned from sediments 24, 26, 28 have spectral intensities which differ from that of acoustic pulse 30, and hence the echoes have different "shapes" from pulse 30 in both the time and frequency domain. It is by matching shapes of returned echoes to shapes which Biot's theory indicates one would expect for a given input signal and acoustic interface, that one characterizes the sediment layers. Equations (a) through (c), above, are discussed in detail in A. Turgut and T. Yamamoto, *Synthetic Seismograms for Marine Sediments and Determination of Porosity and Permeability*, GEOPHYSICS, vol. 53 at pp. 1056 (no. 8, August, 1988), the substance of which is incorporated herein by reference.

Beginning with the echo from the water-bottom interface (60 on FIG. 4), processor 50 uses equation (a) to calculate model waveforms to be compared with the echo. This is done by pre-selecting the realistic ranges for each acoustic parameter in the parameter matrix for sediment 24 (the parameters of water 11 are known a priori, and inserted beforehand into the parameter matrix), selecting a specific set of parameter values within those ranges (62), and then using equation (a) to calculate the corresponding frequency dependent reflection and transmission coefficients $R_1(\omega)$, $T_1(\omega)$, and $T_2(\omega)$. Knowing these frequency dependent quantities, and knowing the spectral content and spectral intensities of acoustic pulse 30, processor 50 calculates what waveform a returned echo would have, given those acoustic parameters (64). Processor 50 does this repeatedly (66), each time varying the acoustic parameters in the parameter matrix to generate a large number of these model waveforms, typically numbering thirty or so (24).

Processor 50 compares the model waveforms to the actual bottom echo 24' (68). This can be done by any cost function which effectively measures similarity, an example of which is:

$$\phi = \Sigma_i [E_{i,obs} - E_{i,cal}]^2 / [E_{i,obs}]^2$$

where $E_{i,obs}$ is the ith digital sample of the observed echo, and $E_{i,cal}$ is the corresponding ith sample of the calculated model waveform. (If the comparison is done using signals in the frequency domain, index i refers to the ith frequency bin.) If $\phi$ for any of the model waveforms is so low as to indicate a match to echo 24'(69), then the process ends, and the acoustic parameters which generated that waveform are taken to be the acoustic parameters of the bottom sediment (70). Processor 50 discards the poorest matching waveforms (72) (typically half of the waveforms), and selects a new set of parameters to generate a new set of waveforms (76, 64) for comparison to echo 24'. The selection is preferably not random, but rather uses any of a number of known searching algorithms to guide parameter selecting, using the acoustic parameters of the surviving (i.e. non-discarded) waveforms as the starting point (74). In this manner, processor 50 iteratively loops between (64) and (74) in FIG. 4, at each iteration using surviving waveforms as the starting point for the next iteration, until a matching waveform is found (69). The acoustic parameters of the matching model waveform will then closely match those of sediment layer 24, effectively identifying the layer's constituents. Examples of such known search schemes which processor 50 could use are simulated annealing and genetic algorithms.

Thereafter, processor 50 proceeds in the same manner to process echo 26' from the interface of sediment layers 24 and 26, this time, however, using Biot equation (c), which pertains to sediment-sediment interfaces, inserting into the equation the acoustic parameters identified for layer 24. In this manner, processor 50 sequentially processes each echo returned to transducer 14, resulting in the characterization of each layer of sediment in order of each layer's displacement down from water bottom.

To calculate waveforms as above described, processor 50 proceeds as follows: Any echo which traverses a sediment layer will be attenuated by the frequency dependent intrinsic attenuation of that layer, and by the frequency dependent reflection coefficient of the sediment interface from which it reflected. In effect, these coefficients are transfer functions. Thus, in the frequency domain, the ratio of a returning echo to the pulse which produced the echo is the same as the produce of the transmission coefficients of all sediment layers through which the signal traveled times the reflection coefficient of the reflecting interface after attenuation effects are removed. The intrinsic attenuation in seawater is effectively zero at all frequencies of interest. Thus for echo 24', the transfer function which relates it to pulse 30 is merely the reflection coefficient $R_1$ for the water-sediment 24 boundary. Thus, after processor 50 performs a fast Fourier transform on digitized echo 24' and reference pulse 30', the signal amplitudes of pulse 30' are compared to those of echo 24', frequency bin by frequency bin. The iterative searching described above in relation to FIG. 4 proceeds until a set of values for the parameter matrix of equation (a) is selected which produces a minimum of cost function $\phi$. Upon doing so, one necessarily has identified the transmission coefficients $R_1(\omega)$, $T_1(\omega)$ and $T_2(\omega)$ for sediment layer 24, and, from these and the values of the parameter matrix, the remaining acoustic parameters of layer 24. For deeper layers, the process is the same, except that one must account for modification of the echo by its having traversed boundaries above the interface of interest, and by complex attenuation of it in layers above the interface of interest. However, because one already has identified the acoustic parameters of the higher layers, correcting for this requires only a straightforward application of standard acoustic techniques.

Of course, multiple reflections among sediment layers will occur, and can add to the signal directly reflected from layers below. Multiple bounce reflection do not frequently change directly reflected signals greatly. Nonetheless, this can be corrected. In the case of echo 26', this echo came from the interface between layers 24 and 26, and will have superimposed on it multiple bounce signal from layer 24. But again, processor 50 has already identified the acoustic characteristics of layer 24, among which are sound speed and acoustic attenuation. A comparison of the arrival time of echoes 24' and 26', permits processor 50 to determine the thickness of layer 24. With this information, and conventional principles of acoustic propagation and attenuation, processor 50 can determine what contribution to waveform 26' came from multiple bounces, and correct for it. The same thing can be don for echoes returned from sediment interfaces yet deeper, although the correction will be more complicated because plural layers would then be contributing multiple bounce signals.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

I claim:

1. A method of characterizing marine sediments, comprising:

generating an acoustic pulse;

detecting an echo of said pulse;

making a determination of whether said echo is from an interface constituted of water-sediment, or constituted of sediment-sediment;

responsive to said determination, choosing the Biot equation pertaining to said interface;

selecting values of the parameter matrix of said Biot's equation;

calculating a model waveform corresponding to said values of said parameter matrix;

applying a preselected cost function to said echo and said model waveform;

determining whether the magnitude of said cost function is below a preselected threshold; and if said cost function is not below said preselected threshold, repeating said selecting, calculating, applying, and determining until said magnitude of said cost function is below said threshold.

2. The method of claim 1, wherein:

said selecting selects a plurality of said parameter matrices;

said calculating calculates a corresponding plurality of model waveforms;

said applying employs said cost function to compare said echo to each of said plurality of model waveforms effective to generate a corresponding plurality of magnitudes of said cost function;

said determining decides whether any of said magnitudes is below said preselected threshold; and if not, said repeating comprises:

causing a preselected number of said plurality of parameter matrices to be discarded, said number of parameter matrices being denominated discarded matrices, the remaining ones of said plurality of matrices being denominated survivor matrices, wherein each of said plurality of magnitudes corresponding to said discarded matrices is larger than each of said plurality of magnitudes corresponding to said survivor matrices;

performing an iterative search to repeat said selecting of said values of said parameter matrix using said survivor matrices as the initial conditions of said iterative search.

3. The method of claim 1, wherein said iterative search is a member of the group consisting of: simulated annealing algorithms, and genetic algorithms.

4. A method for classifying marine sediments comprising:

launching an acoustic pulse into water above said sediments;

detecting at least one echo from said sediments;

selecting a set of acoustic parameters;

using said parameters in Biot's equations to calculate a model waveform;

comparing said model waveform to said echo using a cost function;

iteratively varying said acoustic parameters until the value of said cost function falls below a preselected threshold.

5. An apparatus for classifying marine sediments comprising:

an acoustic signal generator effective to launch an acoustic pulse into water above said sediments;

an acoustic transducer effective for detecting at least one echo from said sediment;

means for selecting a set of acoustic parameters;

a processor effective to use said parameters in Biot's equations, to calculate a model waveform, said processor being further adapted to:

compare said model waveform to said echo using a cost function; and iteratively vary said acoustic parameters until the value of said cost function falls below a preselected threshold.

* * * * *